(12) United States Patent
Sargent

(10) Patent No.: US 10,039,074 B1
(45) Date of Patent: Jul. 31, 2018

(54) LOCATING CONNECTED DEVICES

(71) Applicant: BOSE CORPORATION, Framingham, MA (US)

(72) Inventor: Daniel H. Sargent, Wayland, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/643,052

(22) Filed: Jul. 6, 2017

(51) Int. Cl.
*H04W 24/00* (2009.01)
*H04W 64/00* (2009.01)
*H04W 4/02* (2018.01)
*H04B 17/318* (2015.01)

(52) U.S. Cl.
CPC ........... *H04W 64/00* (2013.01); *H04B 17/318* (2015.01); *H04W 4/023* (2013.01)

(58) Field of Classification Search
None
See application file for complete search history.

(56) References Cited

U.S. PATENT DOCUMENTS

| | | | |
|---|---|---|---|
| 8,401,569 B1 | 3/2013 | Bell et al. | |
| 8,532,644 B2 | 9/2013 | Bell et al. | |
| 8,862,156 B2 | 10/2014 | Bell et al. | |
| 2013/0315038 A1* | 11/2013 | Ferren | G06K 9/3266 367/197 |
| 2015/0113094 A1 | 4/2015 | Williams et al. | |
| 2015/0119067 A1* | 4/2015 | Lavery | H04W 64/003 455/456.1 |
| 2015/0358768 A1* | 12/2015 | Luna | H04W 4/02 455/456.1 |
| 2016/0057522 A1* | 2/2016 | Choisel | H04R 1/08 381/92 |
| 2016/0139241 A1* | 5/2016 | Holz | H04B 17/27 367/128 |

FOREIGN PATENT DOCUMENTS

WO 201661353 A1 4/2016

* cited by examiner

*Primary Examiner* — Erika Washington
(74) *Attorney, Agent, or Firm* — Patterson + Sheridan, LLP

(57) ABSTRACT

Aspects of the present disclosure provide a first apparatus comprising a transmitter, a receiver, a processor, and a UI. The transmitter is configured to command a second apparatus to emit at least one tone. The receiver is configured to receive the at least one tone. The processor is configured to determine at least one of: a signal strength and a direction associated with the at least one tone. The UI is configured to output an indication of a current location of the second apparatus based, at least in part, on the determined signal strength or the determined direction. According to an example, at least one of the request or the at least one tone may be a high-frequency or ultrasonic signal.

20 Claims, 6 Drawing Sheets

LOCATING CONNECTED DEVICES

BACKGROUND

Aspects of the present disclosure generally relate to wireless technology and, more particularly, to locating a lost device.

With advancements in technology, the number of wirelessly-connectable devices is increasing. Some connectable devices are small and easy to misplace. Certain methods for locating a lost device include the lost device emitting sounds audible to humans. The sounds may be disruptive to a user and/or those in the vicinity of the lost device. Certain other methods for locating a lost device include the use of Bluetooth signals. For example, the lost device may communicate with a device local to a user via Bluetooth signaling. While Bluetooth signals are outside the human audible range of frequencies, the strength of Bluetooth signals may not be reliable enough to effectively and efficiently locate a lost device. Discrete and efficient techniques for locating lost devices are desirable.

SUMMARY

All examples and features motioned herein can be combined in any technically possible manner.

Certain aspects provide a first apparatus comprising a transmitter, a receiver, a processor, and a user interface (UI). The transmitter is configured to command a second apparatus to emit at least one tone. The receiver is configured to receive the at least one tone. The processor is configured to determine at least one of: a signal strength and a direction associated with the at least one tone. The UI is configured to output an indication of a current location of the second apparatus based, at least in part, on the determined signal strength or the determined direction.

According to an aspect, the processor is further configured to determine a wireless connection loss between the first apparatus and the second apparatus. The transmitter is configured to command the second apparatus to emit the at least one tone in response to the determined loss of connection.

According to an aspect, the UI is configured to receive a request to command the second apparatus to emit the at least one tone.

According to an aspect, outputting the indication of the current location of the second apparatus includes outputting a display of the current location relative a location of the first apparatus.

According to an aspect, the receiver is configured to receive at least a second tone from the second apparatus. The processor is configured to determine at least one of a signal strength or direction associated with the second tone, and the UI is configured to update the display of the current location relative to the location of the first apparatus, at least in part, on the determined signal strength or the determined direction associated with the second tone.

According to an aspect, the UI is further configured to update the display of the current location as a location of the first apparatus changes.

According to an aspect, the processor is configured to determine the first apparatus is less than a threshold distance away from the second apparatus. In response to the determination, the transmitter is configured to transmit an indication to the second apparatus to provide assistance information to the first apparatus. The assistance information comprises a request for the second apparatus to transmit one or more audible signals, a request for the second apparatus to emit one or more visual signals, or a request for the second apparatus to output one or more vibrations.

According to an aspect, the UI is further configured to output an indication of a previous location associated with the second apparatus.

According to an aspect, the at least one tone comprises one or more ultrasonic tones.

Certain aspects provide a method for locating a second apparatus by a first apparatus. The method generally includes transmitting a request for the second apparatus to emit at least one tone, receiving at least one tone responsive to the request, determining at least one of: a signal strength and direction associated with the received at least one tone, and outputting an indication of a current location of the second apparatus based, at least in part, on the determined signal strength or the determined direction.

According to an aspect, the method further comprises determining a wireless link loss between the first apparatus and the second apparatus. The first apparatus is transmits the request for the second apparatus to emit at least one tone responsive to determining the wireless link loss.

According to an aspect, outputting the indication of the current location of the second apparatus comprises outputting a display of the current location relative a location of the first apparatus.

According to an aspect, the method further comprises receiving at least a second tone from the second apparatus, determining at least one of: a signal strength and direction associated with the second tone, and updating the display of the current location relative to the location of the first apparatus, at least in part, on the determined signal strength or the determined direction associated with the second tone.

According to an aspect, the method further comprises updating the display of the current location as a location of the first apparatus changes.

According to an aspect, the method further comprises determining the first apparatus is less than a threshold distance away from the second apparatus. In response to determining the first apparatus is less than the threshold distance away, the method comprises transmitting an indication to the second apparatus to provide assistance information to the first apparatus. The assistance information comprises a request for the second apparatus to transmit one or more audible signals, a request for the second apparatus to emit one or more visual signals, or a request for the second apparatus to output one or more vibrations.

Certain aspects of the present disclosure provide a first apparatus, comprising a processor and a memory comprising instructions which, when executed by the processor, cause the first apparatus to receive an ultrasonic tone from a second apparatus, determine at least one of: a signal strength and direction associated with the tone, and output an indication of a current location of the second apparatus based, at least in part, on the determined signal strength or the determined direction, wherein the outputted indication iteratively updates based, at least in part, on a location of the first apparatus.

According to an aspect, determining the signal strength or direction comprises repeatedly determining the signal strength or direction as the first apparatus changes locations.

According to an aspect, the instructions cause the processor to determine the first apparatus is less than a threshold distance away from the second apparatus, and, in response to the determination, transmit a request to the second apparatus to provide assistance information to the first apparatus, wherein the assistance information comprises at least one of an audible signal, a visual signal, or a vibration.

Advantages of the methods and apparatus described herein include providing a discrete, efficient way for a user to find a lost device. Other features and advantages will be apparent from the description and the claims.

DETAILED DESCRIPTION

Aspects of the present disclosure relate to locating a lost wireless device. Two devices may be connected via a wireless link layer. For example, a first device is connected to a second device via a wireless connection such as a Bluetooth or Wi-Fi connection. The first device provides a stream of data to the second device via the link layer. For illustrative purposes, the first device may be a handheld or mobile device, such as a smart phone, and the second device may be a pair of headphones. Unless specified otherwise, the term headphone, as used in this document, includes various types of personal acoustic devices such as over-the-ear and in-ear headsets, earphones, earbuds, hearing aids, shoulder or body-worn acoustic devices, or other wireless-enabled acoustic devices.

Figure 1A:
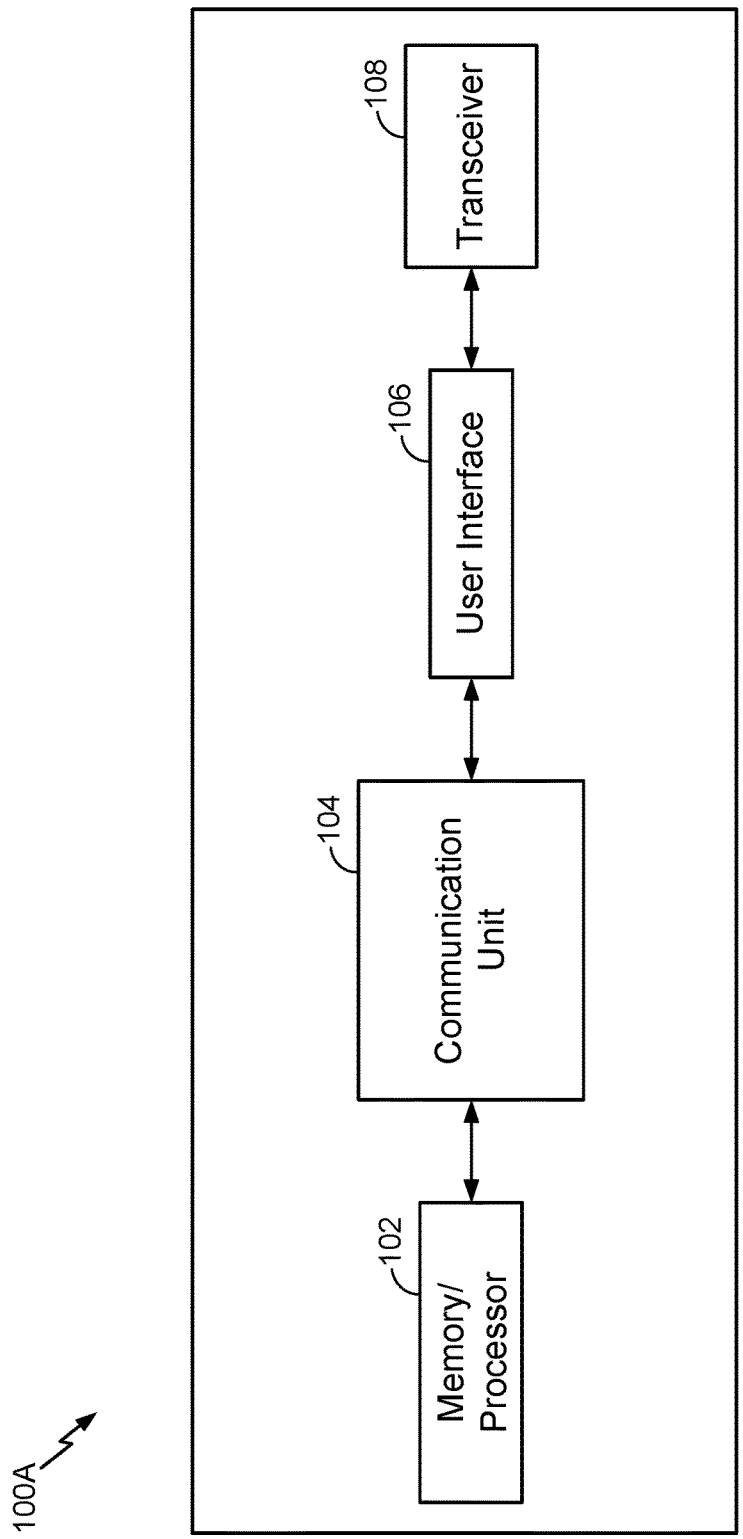
FIG. 1A is a block diagram of a wireless device.

FIG. 1A illustrates example components of a wireless device 100A, for example a mobile device such as a smart phone. The wireless device 100A includes a memory and processor 102, communication unit 104, user interface (UI) 106, and transceiver 108. The memory may include Read Only Memory (ROM), a Random Access Memory (RAM), and/or a flash ROM. The memory stores program code for controlling the memory and processor 102. The memory and processor 102 control the operations of the wireless device 100A. Any or all of the components in FIG. 1A may be combined into multi-function components.

Figure 1B:
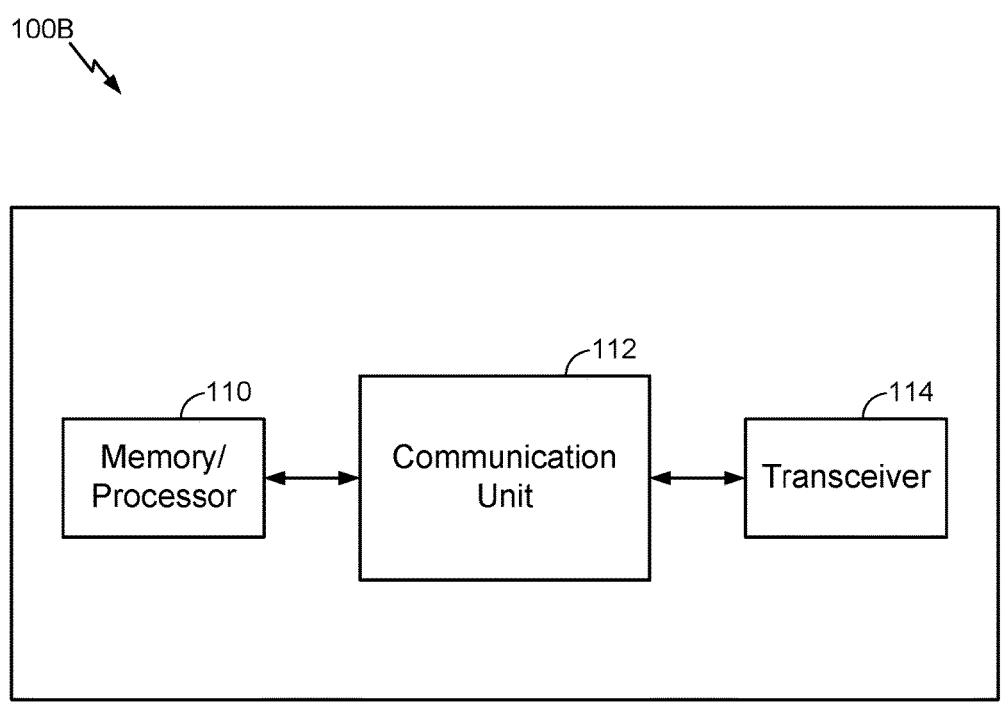
FIG. 1B is a block diagram of a wireless device.

The processor 102 controls the general operation of the wireless device 100A. For example, the processor 102 performs process and control for audio and data communication. In addition to the general operation, the processor 102 initiates determining a signal strength associated with at least one received tone from a not-illustrated, connected second wireless device (for example as shown in FIG. 1B) and/or determining a direction associated with at least one received tone received from the second wireless device, as further described below.

The communication unit 104 facilitates a wireless connection with one or more other wireless devices. For example, the communication unit 104 may include one or more wireless protocol engines such as a Bluetooth engine. While Bluetooth is used as an example protocol, other communication protocols may also be used. Some examples include Bluetooth Low Energy (BLE), Near Field Communications (NFC), IEEE 802.11, or other local area network (LAN) or personal area network (PAN) protocols. The UI 106 outputs an indication of a current location of a second, potentially lost, wireless device as described herein. The second device is wirelessly connected to the first device 100A via a wireless protocol. According to aspects, the UI updates the display of the current location of the second device relative to the location of the first device. According to aspects, the UI 106 receives a request, for example, from a user local to the wireless device 100A, to command the second apparatus to emit at least one tone.

The transceiver 108 transmits and receives information via one or more antennae to exchange information with one or more other wireless devices. According to aspects, the transceiver 108 includes one or more microphones for, for example, receiving sound emitted by one or more other wireless devices. The transceiver 108 is not necessarily a distinct component. The transceiver may be implemented entirely in software executed by the communication unit 104.

The wireless device 100 may include one or more sensors used to track movement of the wireless device 100. According to an example, a sensor is used to track rotational motion as the wireless devices moves, described below with reference to FIG. 4.

FIG. 1B illustrates example components of a wireless device 100B, for example a pair of headphones. The wireless device 100B includes a memory and processor 110, communication unit 112, and transceiver 114. The memory and processor 110, communication unit 112, and transceiver 114 illustrated in FIG. 1B may perform similar functions as the respective memory and processor 102, communication unit 104, and transceiver 108 illustrated in FIG. 1A. Any or all of the components in FIG. 1B may be combined into multi-function components.

The processor 110 controls the general operation of the wireless device 100B. The transceiver 114 receives a command from another wireless device (such as a wireless device 100A illustrated in FIG. 1A) to emit at least one tone. The processor 110, in combination with the communication unit 112, and transceiver 114 are configured to emit at least one tone. As described in more detail herein, the at least one tone may be ultrasonic or contain high frequency content or frequencies outside a human audible range.

According to an example, the wireless device 100B receives a request to transmit assistance information. As described further below, the assistance information may be used by a user local to wireless device 100A to help find the connected and perhaps not currently locatable wireless device 100B. In response to the request for assistance information, the wireless device 100B transmits one or more audible signals, one or more visual signals, or outputs one or more vibrations.

The procedure for locating a lost device may begin after an initiation event. According to an example, an initiation event includes a link loss between a first device and a second, potentially lost, device. A link loss occurs when at least one of the first or second device go out of wireless range of the other device. In another example, an initial event may include user input at the user interface of the first device, where the user input indicates a user would like to begin locating a second, potentially lost, device. An initiation event may include a scenario resulting in a disconnection between the first and second device (e.g., as would occur when a first device moves out of wireless range of the second device).

Upon determining a link loss or disconnection between the first and second device, the first device attempts to re-establish connection with the second device. If the first device is unable to re-establish the connection to the second device, the first device may output information to help guide a user of the first device to the second device.

According to an example, the first device may output an indication of the second device's last known location via one or more bars. The height of the bar(s) vary as the user moves, for example in a circle or around a physical space. According to an example, the height of the bars correlates to a signal strength associated with a last-known location of the second device.

The indications are intended to guide a user of the first device to move towards the last known location of the second device such that the first device is in connection range of the second device.

According to an example, an initiation event may also be initiated by a user. A user may interact with a first device, via a UI, initiating a process for locating a second wireless device. In this scenario, the user local to the first device may already be in connection range of the second device. As an example, the user may be close to the second wireless device and needs assistance to find an already connected but not currently locatable, second wireless device.

The process of locating the second device begins once the first device is in wireless communication range with the second device. The first device may assist a user in finding the second device after the first device and the second device are wirelessly connected.

Figure 2:
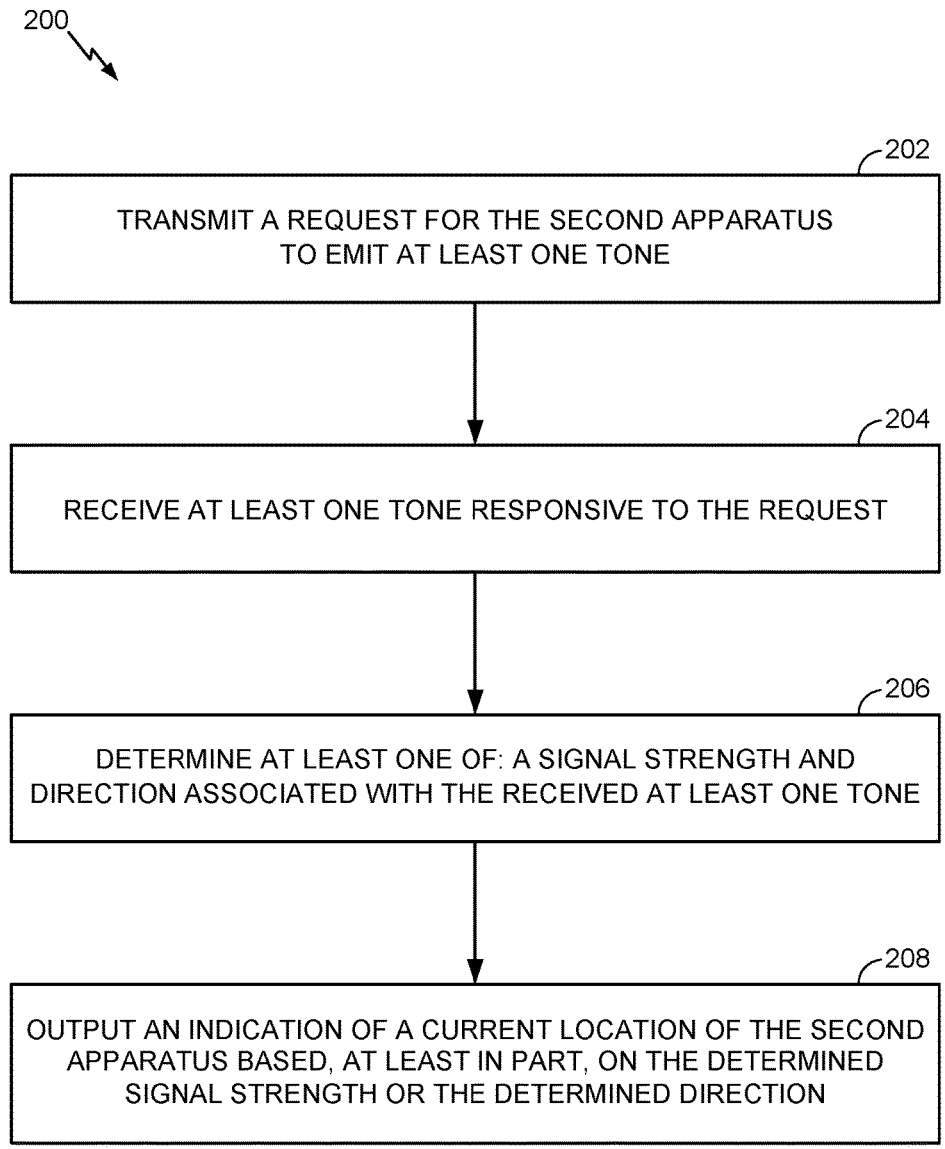
FIG. 2 is a flow diagram illustrating example steps for locating a connected device.

FIG. 2 illustrates example operations 200 performed by a first wireless device after the first and second wireless devices are wireless connected following an initiation event. The first device has one or more of the components illustrated in FIG. 1A.

At 202, the first device transmits a request, for example via the wireless communication protocol over which the two devices are connected, for the second device to emit at least one tone. At 204, the first device receives at least one tone in response to the request. Advantageously, one or both the request and the at least one tone contain high frequency content or frequencies outside a human audible range. According to an example, both the request and one or more tones are inaudible or virtually inaudible to humans, so as not to be annoying, yet are detectable by receivers/microphones in the first and second wireless devices.

According to an example, the request and/or the at least one tone may be an ultrasonic or high frequency tone. Because ultrasonic and high-frequency tones are highly directional, the first device may use ultrasonic or high-frequency tones received from the second device to determine a geographical location and/or direction of the second device relative to the first device. As described herein, high-frequency refers a frequency at or above approximately 8 kilohertz (kHz) and ultrasonic refers to a frequency at or above approximately 20 kHz. According to an example, the request and the one or more tones may include audio content having a high frequency, generally outside a human's range of hearing. For reference, human speech is generally centered between 1 kHz to 5 kHz. Thus, the request and/or the one or more tones may be transmitted at frequencies above at least 5 kHz. According to an example, the request and/or the one or more tones have a frequency greater than or equal to approximately 16 kHz.

At 206, the first device determines at least one of a signal strength and direction associated with the received at least one tone. The signal strength, determined by the amplitude of the one or more received tones, is used to estimate the distance of the second device from the first device. According to aspects, the first device requests that the second device continuously outputs a tone or periodically outputs the tone. A receiver/microphone at the first device continuously monitors the output from the second device to determine the signal strength, for example, as a user local to the first device moves around a physical space. The direction of the first device in relation to the second device may be determined by the radiation pattern and signal strength of the one or more received tones. As ultrasonic and high-frequency tones are highly directional, most of the radiation will be emitted in a direction corresponding to the location of the second device. Thus, a receiver/microphone at the first device may continuously monitor the output from the second device to determine the signal strength, for example, as a user local to the first device rotates around a physical space. When the user is facing the direction of the second device, the signal strength of the one or more received tones will be higher.

At 208, the first device outputs an indication of a current location of the second device based, at least in part, on the determined signal strength or the determined direction. According to an example, based on a determined location of the first device, the first device outputs, via a UI, a display of the current location of the second device relative to the location of the first device.

As described above, according to an example, the second device continuously outputs a tone or outputs more than one tone. The first device iteratively determines a signal strength and/or direction associated with the output. In response to the updated signal strengths and/or direction, the UI of the first device updates the display of the current location of the second device relative to the location of the first device. According to another example, the first device periodically receives a tone from the second device. The first device determines at least one of a signal strength and direction associated with the tones received from the second device. Additionally, the first device updates the display of the current location of the second device relative to the location of the first device based on the information gathered from the tones. In this manner, the first device assists a user to locate the second device.

Figure 3:
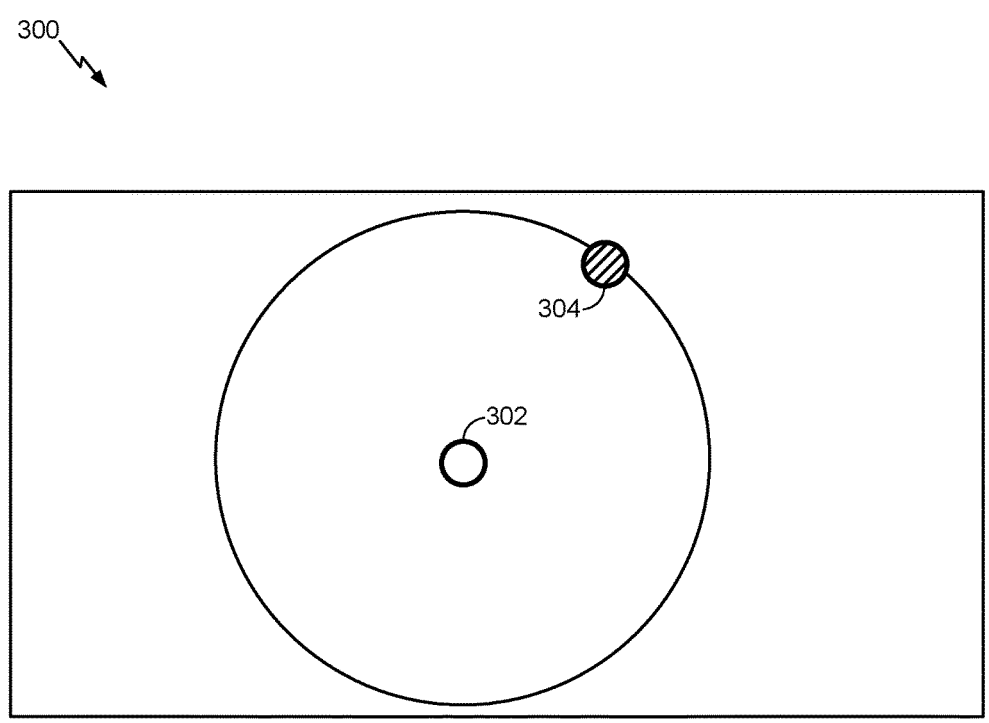
FIG. 3 illustrates an example environment where a first device local to a user is illustrated in the center of a graphical display.

FIG. 3 illustrates an example user interface environment 300. The first device, local to a user, is illustrated at 302. The device to be located, referred to as the second device, is illustrated at 304. The first device 302 is illustrated approximately in the center of the graphical output of the UI. The UI does not initially output an indication of the second device 304. As will be illustrated in FIGS. 4 and 5, as the first device 302 moves in a physical space, the UI continuously updates the direction of a strongest received signal. Stated otherwise, the first device determines a location of the second device based on the signal strength and/or direction of the one or more tones transmitted by the second device.

Figure 4:
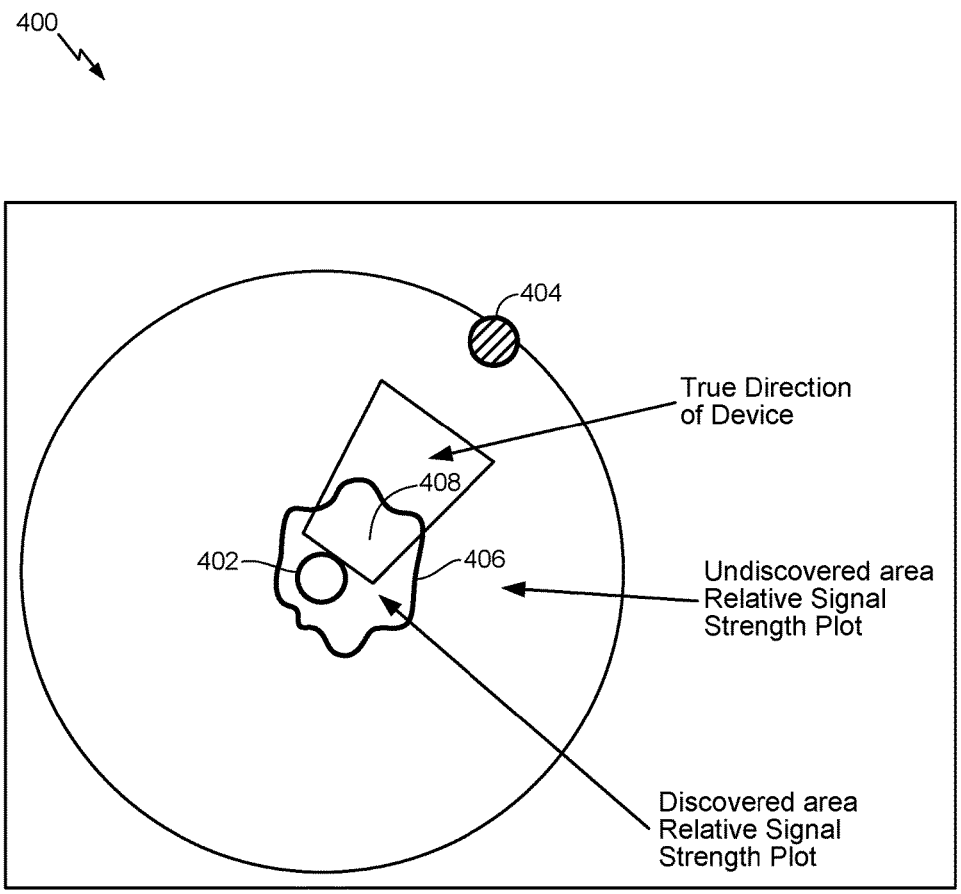
FIG. 4 illustrates an example output of a UI.

FIG. 4 illustrates an example output 400 of a UI, according to aspects of the present disclosure. The UI guides a user local to the first device to a current location of the second device. Initially, only the first device 402 is illustrated, approximately in the center of the graphical output. Similar to FIG. 3, the location of the second device 404 may be unknown. The UI may not initially illustrate the location of the second device 404.

As the first device 402 moves in an environment, the signal strength from the second device rises and falls. According to an example, a user local to the first device 402 makes a full rotation standing in place. The first device receives one or more tones from the second device and determines at least one of a signal strength or direction associated with the second device. The UI outputs an indication of the relative signal strength of the tone received from the second device as the first device 402 moves.

Line 406 indicates the strength of the signal transmitted from the second device as the first devices 402 makes a full rotation. Line 406 outlines a discovered area relative signal strength plot. After one rotation, a general direction of the second device is indicated by the most uncovered portion 408 of the discovered area indicated by line 406. Thus, the UI displays the relative signal strength associated with transmissions from the second device by uncovering an area, marked by 406, around the first device 402. Accordingly, the second device is located in direction of the most uncovered portion 408 defined by the discovered area 406.

As the first device 402 moves, the UI updates the direction of the strongest relative signal strength measurement. By moving in the direction of a most uncovered area 408, the first device approaches the location of the second device.

Figure 5:
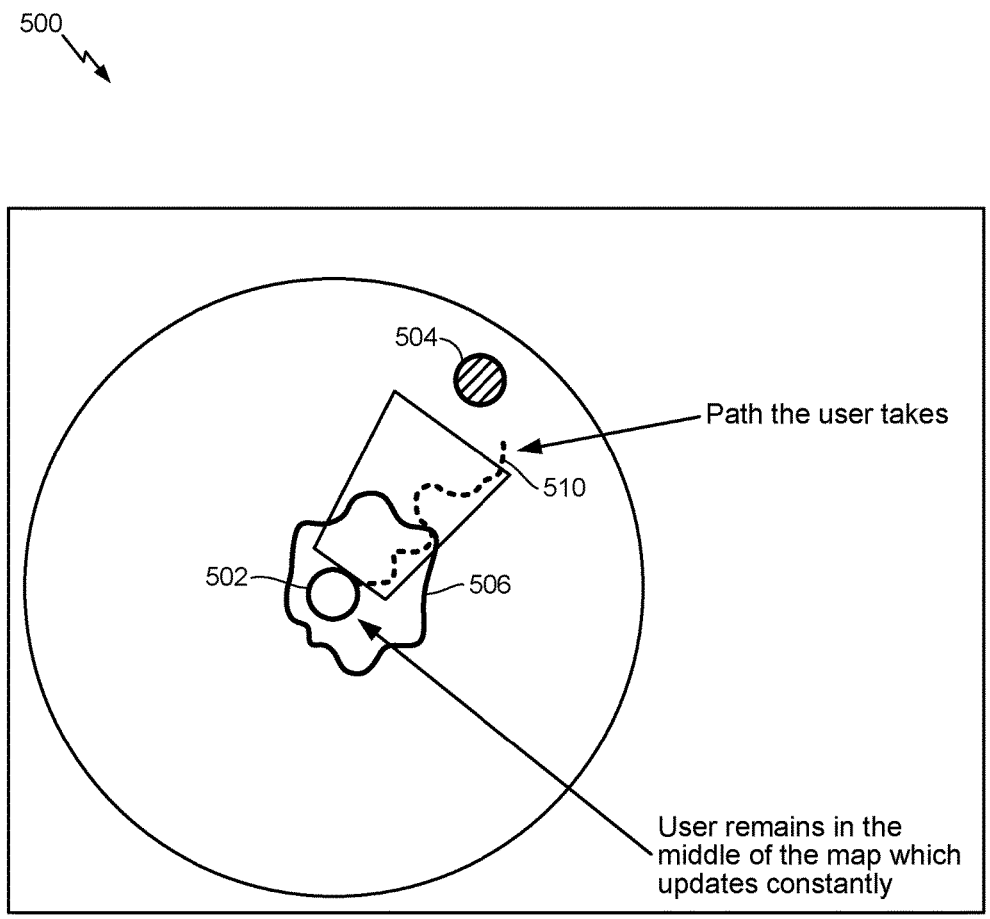
FIG. 5 illustrates an example of an updated output of a UI.

FIG. 5 illustrates an output 500 of a UI, according to aspects of the present disclosure. The UI guides a user local to the first device to a current location of the second device. Similar to FIGS. 3 and 4, initially, only the first device 502 is illustrated, approximately in the center of the graphical output as the first device 502 guides the user to the second device 504. The UI may not illustrate the location of the second device 504. The first device 302, 402, and 502 represent the same first device. The second device 304, 404, and 504 represent the same second device.

As the first device 502 moves, it remains in the center of the UI 500. The first device iteratively determines signal strength and/or direction associated with the second device based on one or more received tones from the second device. The first device continuously updates the direction of the current location of the second device based on the signal strength and/or direction. Line 510 illustrates the path a user may follow, moving towards a most uncovered portion of the discovered area 506.

According to an example, the UI may display one or more bars, wherein the height of the one or more bars correlates with a direction of the second device. Initially, the UI may display no bars or one or more bars having a small height, indicating no or weak signal strength associated with one or more tones transmitted from the second device. As the first device moves in a physical space, the height of the bars vary based on a strongest received signal or direction associated with the second device. Accordingly, the first device determines a location of the second device based on the signal strength and/or direction of the one or more tones emitted by the second device, wherein the signal strength and/or direction is indicated via the UI based on the height of the displayed bar(s).

When the first device is close to the second device, the first device may request assistance information from the second device. As described above, the first device may use the signal received from the second device to determine distance and direction to the second device. When the devices are less than a threshold distance away from each other, the first device may transmit an indication to the second device to provide assistance information to the first apparatus. According to an example, the assistance information includes one or more of a request for the second device to transmit one or more audible signals, a request for the second device to emit one or more visual signals (such as flashing lights), or a request for the second device to output one or more vibrations. This information may help a user local to the first device to find the second device.

According to an aspect, the second device may be lost in an environment in which two or more devices configured to communicate with the second device are present. The method for locating the connected, lost second device described above may be enhanced by using multiple devices in the environment of the second device.

As an example, the first device local to the user may transmit a request to multiple devices in the environment to initiate a search for the second, potentially lost, device. According to an example, the multiple devices may include the components illustrated in FIG. 1. Following an initiation event between the first device local to the user and the second device, the one or more of the multiple devices equipped with a microphone and wirelessly compatible with the second device transmit a command for the second device to emit one or more high-frequency or ultrasonic tones. Any of the devices which receive the one or more high frequency tones report the signal strength and/or direction of the second device to the first device. The UI of the first device reports to the user, for example, via a graphical display, the location of the second device in the environment. When the first and second device are less than a threshold distance away from each other, the first device requests for the second device to provide assistance information in the form of visual, audio, and/or haptic output.

Aspects of the present disclosure can be combined with the ideas disclosed in U.S. application Ser. No. 15/642,946, entitled "DETERMINING LOCATION/ORIENTATION OF AN AUDIO DEVICE" filed on Jul. 6, 2017, to locate the second device with higher accuracy. U.S. application Ser. No. 15/642,946 is expressly incorporated herein by reference in its entirety.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. A first apparatus comprising:
 a transmitter configured to command a second apparatus to emit at least one tone;
 a receiver configured to receive the at least one tone;
 a processor configured to determine at least one of: a signal strength and a direction associated with the at least one tone; and
 a user interface (UI) configured to output an indication of a relative signal strength or the direction associated with the at least one received tone as the first apparatus moves, wherein the indication outlines a discovered area and wherein a most uncovered portion of the discovered area indicates a current location of the second apparatus.

2. The first apparatus of claim 1,
 wherein the processor is further configured to determine a wireless connection loss between the first apparatus and the second apparatus, and
 the transmitter is configured to command the second apparatus to emit the at least one tone in response to the determined loss of connection.

3. The first apparatus of claim 1, wherein the UI is configured to receive a request to command the second apparatus to emit the at least one tone.

4. The first apparatus of claim 1, wherein outputting the indication of the current location of the second apparatus comprises:

outputting a display of the current location relative a location of the first apparatus.

5. The first apparatus of claim 4, wherein:
the receiver is configured to receive at least a second tone from the second apparatus,
the processor is configured to determine at least one of: a signal strength and direction associated with the second tone; and
the UI is configured to update the display of the current location relative to the location of the first apparatus, at least in part, on the determined signal strength or the determined direction associated with the second tone.

6. The first apparatus of claim 4, wherein:
the UI is further configured to update the display of the current location as a location of the first apparatus changes.

7. The first apparatus of claim 6, wherein updating the display comprises:
varying a height of one of more displayed bars as the location of the first apparatus changes, wherein the height of the one or more displayed bars correlates to the current location relative to the location of the first apparatus.

8. The first apparatus of claim 1,
wherein the processor is configured to determine the first apparatus is less than a threshold distance away from the second apparatus; and
in response to the determination, the transmitter is configured to transmit an indication to the second apparatus to provide assistance information to the first apparatus.

9. The first apparatus of claim 8, wherein the assistance information comprises a request for the second apparatus to transmit one or more audible signals, a request for the second apparatus to emit one or more visual signals, or a request for the second apparatus to output one or more vibrations.

10. The first apparatus of claim 1, wherein the at least one tone comprises one or more ultrasonic tones.

11. A method for locating a second apparatus by a first apparatus, comprising:
transmitting a request for the second apparatus to emit at least one tone;
receiving at least one tone responsive to the request;
determining at least one of: a signal strength and direction associated with the received at least one tone; and
outputting an indication of a relative signal strength or the direction associated with the at least one received tone as the first apparatus moves, wherein the indication outlines a discovered area and wherein a most uncovered portion of the discovered area indicates a current location of the second apparatus.

12. The method of claim 11, further comprising:
determining a wireless link loss between the first apparatus and the second apparatus,
wherein transmitting the request is responsive to determining the wireless link loss.

13. The method of claim 11, wherein outputting the indication of the current location of the second apparatus comprises:
outputting a display of the current location relative a location of the first apparatus.

14. The method of claim 13, further comprising:
receiving at least a second tone from the second apparatus;
determining at least one of: a signal strength and direction associated with the second tone; and
updating the display of the current location relative to the location of the first apparatus, at least in part, on the determined signal strength or the determined direction associated with the second tone.

15. The method of claim 13, further comprising:
updating the display of the current location as a location of the first apparatus changes.

16. The method of claim 11, further comprising:
determining the first apparatus is less than a threshold distance away from the second apparatus; and
in response to determining the first apparatus is less than the threshold distance away, transmitting an indication to the second apparatus to provide assistance information to the first apparatus.

17. The method of claim 16, wherein the assistance information comprises a request for the second apparatus to transmit one or more audible signals, a request for the second apparatus to emit one or more visual signals, or a request for the second apparatus to output one or more vibrations.

18. A first apparatus, comprising:
a processor and memory comprising instructions which, when executed by the processor, cause the first apparatus to:
receive an ultrasonic tone from a second apparatus;
determine at least one of: a signal strength and direction associated with the tone; and
output an indication of a relative signal strength or the direction associated with the at least one received tone as the first apparatus moves, wherein the indication outlines a discovered area and wherein a most uncovered portion of the discovered area indicates a current location of the second apparatus, wherein the discovered area iteratively updates based, at least in part, on a location of the first apparatus.

19. The first apparatus of claim 18, wherein determining the signal strength or direction comprises:
repeatedly determining the signal strength or direction as the first apparatus changes locations.

20. The first apparatus of claim 18, further comprising:
determining the first apparatus is less than a threshold distance away from the second apparatus; and
in response to determination, transmitting a request to the second apparatus to provide assistance information to the first apparatus, wherein the assistance information comprises at least one of an audible signal, a visual signal, or a vibration.

* * * * *